(No Model.)
E. D. McLAUGHLIN.
CHEESE CUTTER.
No. 592,817. Patented Nov. 2, 1897.
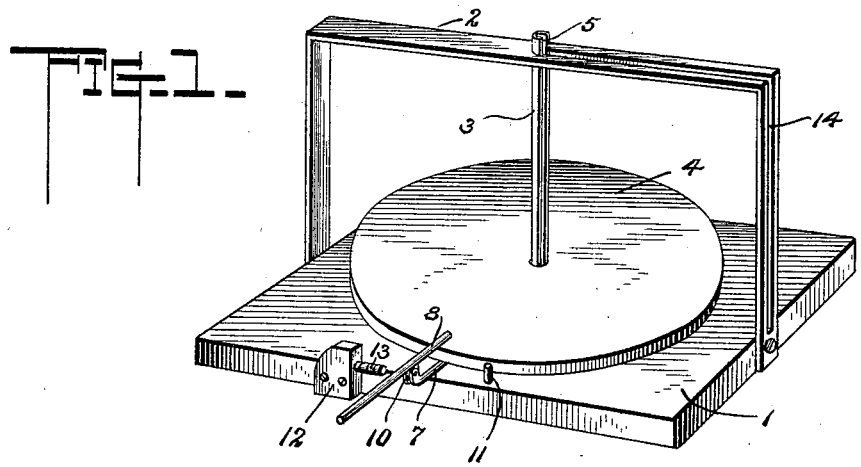
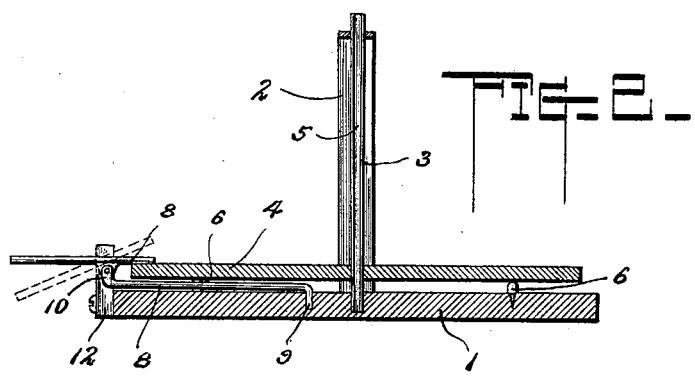
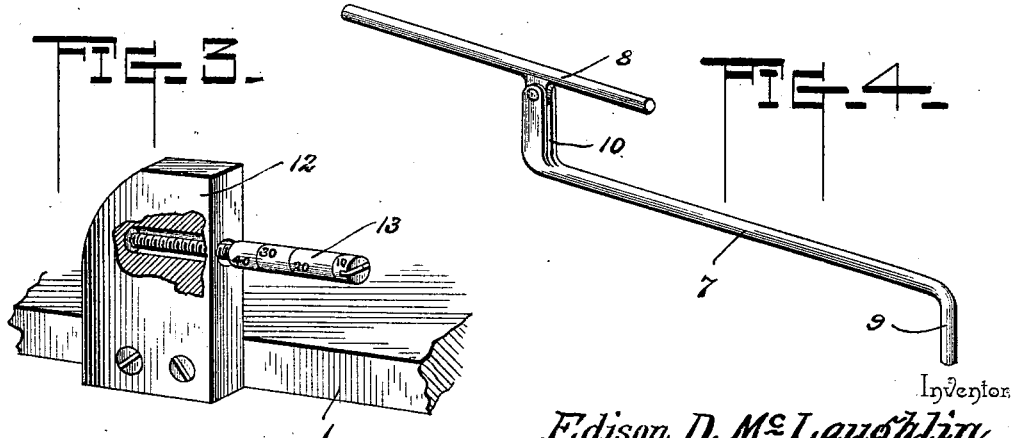
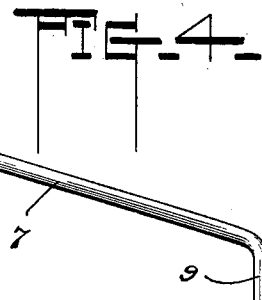
Inventor
Edison D. McLaughlin,
By his Attorneys.
Witnesses
A. M. Poynton
U. B. Hillyard.

UNITED STATES PATENT OFFICE.

EDISON D. McLAUGHLIN, OF PESHTIGO, WISCONSIN.

CHEESE-CUTTER.

SPECIFICATION forming part of Letters Patent No. 592,817, dated November 2, 1897.

Application filed August 28, 1896. Serial No. 604,247. (No model.)

*To all whom it may concern:*

Be it known that I, EDISON D. MCLAUGHLIN, a citizen of the United States, residing at Peshtigo, in the county of Marinette and State of Wisconsin, have invented a new and useful Cheese-Cutter, of which the following is a specification.

The purpose of the present invention is to provide means for subdividing cheeses into equal or any required number of parts, as desired, without necessitating the weighing or gaging of the same for each and every cut.

By this invention a cheese of twenty pounds may be subdivided into twenty equal parts of one pound each, and the apparatus can be adjusted to the weight and size of the cheese to be divided, so as to separate it into the required number of parts, thereby saving time and avoiding wasting of the product.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the invention. Fig. 2 is a transverse section thereof. Fig. 3 is a detail view of the gage for varying the stroke of the grip, by means of which the table is turned to bring the cheese in position for the action of the knife in severing the part to be cut therefrom. Fig. 4 is a detail view of the grip.

Corresponding and like parts are referred to in the following description and indicated in the several views of the drawings by the same reference-characters.

The base 1 has an arched frame 2 secured thereto and supports the operating parts. A rod 3 is supported in the base and horizontal portion of the arched frame and forms a center about which the cheese to be subdivided turns and is the means for holding the cheese and the table 4 in proper position. This rod has a groove 5 in one side, which forms a guide for the point of the knife, by means of which the cutting is effected. The table 4 is circular in outline and is centrally apertured for the passage of the rod 3 and is placed upon supports 6, rising from the base 1, whereby a space is provided between the base and the table for the free operation of the grip, by means of which the table and the cheese placed thereon are rotated the required distance.

The grip consists of an arm 7 and a lever 8, the inner end of the arm being bent, as shown at 9, and entering an opening in the base 1, and its outer end being cleft and bent, as shown at 10. The arm turns upon the inner bent end 9, and the bent end 10 clears the outer edge of the table 4, and the lever 8 is pivoted thereto between its ends, the inner end of the lever extending over the edge portion of the table, so as to grip the latter between it and the arm, and the outer end projecting so as to be conveniently grasped to grip and release the table as required. Upon depressing the outer end of the lever 8 the table is released and upon elevating the said end the table is gripped and may be moved in either direction. A pin or stop 11 is provided upon the base to engage with and limit the movement of the grip in one direction, and a corresponding stop is secured to the base a short distance from the stop 11, so as to limit the movement of the grip or arm 7 in an opposite direction. This latter stop is in the nature of a gage and is adjustable, so as to admit of varying the throw or movement of the grip, and consists of an upright 12 and a set-screw 13, the latter entering a threaded opening of the upright and having its outer portion provided with a series of graduations, which, when brought in coincident relation with the edge or face of the upright 12, will determine the number of movements of the grip necessary to cause a complete revolution of the table about the rod 3, so that the apparatus may be set to cut a cheese of required size and weight into any desired number of parts. If a cheese weighs thirty pounds and it be required to cut it into thirty equal parts of one pound each, the set-screw 13 is turned until the graduation 30 is brought in register with the face or edge of the upright, and upon operating the grip to the limit of its throw between the two stops the table will be turned upon thirty movements of the grip, and if the cheese weighs twenty pounds the set-screw is adjusted until the graduation 20 is brought in register with the face of the upright, thereby attaining the desired end. Thus by a proper adjustment of the set-screw the table may be turned a distance corresponding to the slice or size of the part to be cut from the cheese.

One-half of the horizontal portion of the arched frame and the adjacent vertical portion thereof have a slot 14, through which the knife operates when cutting the cheese, said knife being the ordinary cheese-knife.

When placing a cheese upon the table prior to cutting, the rod 3 is removed, and after the cheese is in place the rod 3 is passed through it and holds the cheese and table in proper position. The cutting is effected by passing the knife longitudinally through the center of the cheese, the knife being guided by having its end moving in the groove 5, and after the end of the knife reaches the table the handle portion is turned, so as to bring the knife into a horizontal position, thereby completing the cut, after which the knife is withdrawn. The grip is now engaged with the table and moved until it engages with the set-screw 13, the latter being previously properly adjusted, thereby bringing the cheese into such a position so that upon making the next cut the part severed will be of the required weight and size.

The apparatus will be protected by the usual screen or cheese-hoop, thereby preventing flies and like insects from reaching the cheese.

The device in its entirety involves a simple construction and arrangement of parts, and is effective for the purpose designed, and is capable of being placed upon the market at a comparatively low cost, and the means for varying the movement of the cheese-supporting table are positive in action and admit of the throw of the grip being varied to a certainty and without the employment of any implement or tool, thereby adapting the device for general use.

Having thus described the invention, what is claimed as new is—

1. In a cheese-cutter, the combination with a movable table, of a grip comprising a movable arm, and a lever pivoted to the said arm and having a portion extending over and adapted to grip the table between it and the movable arm, substantially in the manner and for the purpose set forth.

2. The combination with a rotary table, of a pivoted arm, and a lever having pivotal connection between its ends with the arm and having an end portion extending over and adapted to grip an edge portion of the table between it and the pivoted arm, substantially in the manner and for the purpose set forth.

3. In a device for cutting cheese or like product into pieces of required size, the combination of a base, a table for supporting the product to be subdivided rotatably mounted upon the base, a grip for turning the table to move the product into position to be cut pivotally connected with the base, a fixed stop applied to the base for limiting the return stroke of the grip, an upright secured to the base and having a threaded opening, and a set-screw mounted in the threaded opening of the upright and having its outer portion graduated, and adapted to be turned to bring the required graduation in coincident relation with the front edge of the upright to limit the forward movement of the grip, substantially in the manner set forth for the purpose described.

In testimony that I claim the foregoing as my own I have hereto affixed my signature in the presence of two witnesses.

EDISON D. McLAUGHLIN.

Witnesses:
H. E. FLYNN,
L. McLAUGHLIN.